United States Patent
Haneda et al.

(10) Patent No.: US 8,469,416 B2
(45) Date of Patent: Jun. 25, 2013

(54) IMPACT ABSORBING DEVICE FOR VEHICLE AND BUMPER DEVICE FOR VEHICLE

(75) Inventors: Shinichi Haneda, Anjo (JP); Shuji Inoue, Nishio (JP); Makoto Ito, Toyota (JP); Kenichi Adachi, Chiryu (JP); Kiyoichi Kita, Okazaki (JP); Jun Shobo, Anjo (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 13/137,020

(22) Filed: Jul. 15, 2011

(65) Prior Publication Data

US 2012/0025547 A1  Feb. 2, 2012

(30) Foreign Application Priority Data

Jul. 28, 2010  (JP) .................................. 2010-169651

(51) Int. Cl.
*B60R 19/34*  (2006.01)
(52) U.S. Cl.
USPC ..... 293/133; 293/155; 296/187.09; 296/187.1
(58) Field of Classification Search
USPC ................... 293/133, 155; 296/187.09, 187.1
See application file for complete search history.

(56) References Cited

U.S. PATENT DOCUMENTS

| 3,998,485 A | * | 12/1976 | Putter et al. | .................... | 293/133 |
| 5,732,801 A | * | 3/1998 | Gertz | ........................... | 188/377 |
| 6,068,329 A | * | 5/2000 | Miller | ....................... | 296/187.11 |
| 6,659,519 B2 | * | 12/2003 | Turner | ........................... | 293/117 |
| 6,971,694 B2 | | 12/2005 | Sakuma et al. | | |
| 2006/0290149 A1 | * | 12/2006 | Roll et al. | ...................... | 293/133 |

FOREIGN PATENT DOCUMENTS

| JP | 2001-198659 | 7/2001 |
| JP | 2005-001462 | 1/2005 |
| JP | 2005-104236 | 4/2005 |
| JP | 2005-225394 | 8/2005 |
| JP | 2005-271858 | 10/2005 |
| JP | 2007-030725 A | 2/2007 |
| JP | 2009-154587 | 7/2009 |

OTHER PUBLICATIONS

European Search Report dated Aug. 24, 2011.

* cited by examiner

*Primary Examiner* — Dennis Pedder
(74) *Attorney, Agent, or Firm* — Finnegan, Henderson, Farabow, Garrett & Dunner, LLP

(57) ABSTRACT

An impact absorbing device for a vehicle includes an impact-absorbing portion including an inner wall surface extending smoothly in an axial direction and configured to compressively deform in the axial direction for absorbing an impact energy, a first attaching portion closing an opening end of the impact-absorbing portion closer to a bumper reinforcement and configured to be attached to the bumper reinforcement, a second attaching portion extending from an opening end of the impact-absorbing portion closer to the side member and configured to be attached to a side member, a readily deformable portion provided at the impact-absorbing portion and formed by forming a plate thickness to be thinner in a partial range of the impact-absorbing portion in the axial direction, and an initial peak load restraining portion provided at the first attaching portion and set to be away from the bumper reinforcement in the axial direction, which are integrally formed.

7 Claims, 3 Drawing Sheets

Forward ←———————————→ Rearward

IMPACT ABSORBING DEVICE FOR VEHICLE AND BUMPER DEVICE FOR VEHICLE

CROSS REFERENCE TO RELATED APPLICATIONS

This application is based on and claims priority under 35 U.S.C. §119 to Japanese Patent Application 2010-169651, filed on Jul. 28, 2010, the entire content of which is incorporated herein by reference.

TECHNICAL FIELD

This disclosure generally relates to an impact absorbing device for a vehicle and a bumper device for a vehicle.

BACKGROUND DISCUSSION

A known crash box serving as an impact-absorbing device for a vehicle is disclosed in JP2005-225394A (i.e., hereinafter referred to as Patent reference 1). The known impact-absorbing device disclosed in the Patent reference 1 is made from a forged member made of aluminum alloy and integrally includes a cylindrical impact-absorbing portion having a constant cross section in an axial direction, a bumper side attaching portion for closing one of end openings of the impact-absorbing portion, and a vehicle body side attaching portion formed in a flange shape which extends from the other of end openings of the impact-absorbing portion.

Another known crash box disclosed in JP2005-1462A (i.e., hereinafter referred to as Patent reference 2) is made from a forged member made of aluminum alloy and integrally includes a cylindrical impact-absorbing portion having a constant cross-section in an axial direction, a bumper side attaching portion for closing one of end openings of the impact-absorbing portion, and a cylindrical vehicle body side attaching portion extending in an axial direction from the other end openings of the impact-absorbing portion.

A known crash box disclosed in JP2005-271858A (i.e., hereinafter referred to as Patent reference 3) includes a cylindrical impact-absorbing portion made from an extrusion member made of aluminum alloy, a plate-shaped bumper side attaching portion for closing one of end openings of the impact-absorbing portion, and a plate-shaped vehicle body side attaching portion for closing the other of end openings of the impact-absorbing portion. The impact-absorbing portion, the bumper side attaching portion, and the vehicle body side attaching portion are, for example, connected by welding.

With the constructions disclosed in Patent reference 1 and Patent reference 2, a configuration of material for the forging and freedom of design in configuration are limited. Because the impact absorbing device disclosed in the Patent reference 1 and the Patent reference 2 cannot be formed only by a forging process, it is assumed that a pressing process, or the like, may be required after the forging process. Thus, manufacturing hours and manufacturing costs are increased.

The crash box disclosed in the Patent reference 3 includes three separate members, that is, the impact-absorbing portion, the bumper side-attaching portion, and the vehicle body side attaching portion, and thus requiring a welding process for connecting the separate members. This increases the manufacturing hours and manufacturing costs. Further, because the impact-absorbing portion is made by extrusion, a configuration of the impact-absorbing portion is limited to have a constant cross-section in an axial direction.

JP2001-198659A (i.e., referred to as Patent reference 4) discloses an aluminum alloy member which is applicable to casting of the crash box. The aluminum alloy member disclosed in the Patent reference 4 is Al—Si alloy which is similar to an eutectic composition, which excels in castability. However, because Sr is not added in the aluminum alloy member disclosed in the Patent reference 4, the refinement of the eutectic Si phase is likely to be inadequate and a ductility of a cast member (crash box) may decline.

A need thus exists for an impact absorbing device for a vehicle and a bumper device for a vehicle which is not susceptible to the drawback mentioned above.

SUMMARY

In light of the foregoing, according to an aspect of this disclosure, an impact absorbing device for a vehicle, the impact absorbing device made of aluminum alloy and configured to be provided between a bumper reinforcement extended in a vehicle width direction and a side member extended in a front-rear direction of the vehicle at an end portion of the bumper reinforcement, includes a cylindrical impact-absorbing portion including an inner wall surface extending smoothly in an axial direction, the impact-absorbing portion being configured to compressively deform in the axial direction for absorbing an impact energy, a first attaching portion closing an opening end of the impact-absorbing portion closer to the bumper reinforcement and configured to be attached to the bumper reinforcement, a second attaching portion extending from an opening end of the impact-absorbing portion closer to the side member and configured to be attached to the side member, a readily deformable portion provided at the impact-absorbing portion, the readily deformable portion formed by forming a plate thickness to be thinner in a partial range of the impact-absorbing portion in the axial direction, and an initial peak load restraining portion provided at the first attaching portion and set to be away from the bumper reinforcement in the axial direction. The cylindrical impact-absorbing portion, the first attaching portion, the second attaching portion, readily deformable portion, and the initial peak load restraining portion are integrally formed.

According to another aspect of this disclosure, a bumper device for a vehicle includes a bumper reinforcement extended in a vehicle width direction, and an impact absorbing device for a vehicle. The impact absorbing device is made of aluminum alloy and configured to be provided between a bumper reinforcement extended in a vehicle width direction and a side member extended in a front-rear direction of the vehicle at an end portion of the bumper reinforcement. The impact absorbing device includes a cylindrical impact-absorbing portion including an inner wall surface extending smoothly in an axial direction, the impact-absorbing portion being configured to compressively deform in the axial direction for absorbing an impact energy, a first attaching portion closing an opening end of the impact-absorbing portion closer to the bumper reinforcement and configured to be attached to the bumper reinforcement, a second attaching portion extending from an opening end of the impact-absorbing portion closer to the side member and configured to be attached to the side member, a readily deformable portion provided at the impact-absorbing portion, the readily deformable portion formed by forming a plate thickness to be thinner in a partial range of the impact-absorbing portion in the axial direction, and an initial peak load restraining portion provided at the first attaching portion and set to be away from the bumper reinforcement in the axial direction. The cylindrical impact-absorbing portion, the first attaching portion, the second attaching portion, readily deformable portion, and the initial peak load restraining portion are integrally formed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of an impact absorbing device for a vehicle and a bumper device for a vehicle will be explained with reference to illustrations of drawing figures as follows. Hereinafter, directions, such as "front/rear", "upper/lower", "top/bottom", "inner/outer", "width direction", "axial direction", or the like, correspond to an orientation of the vehicle.

Figure 3:
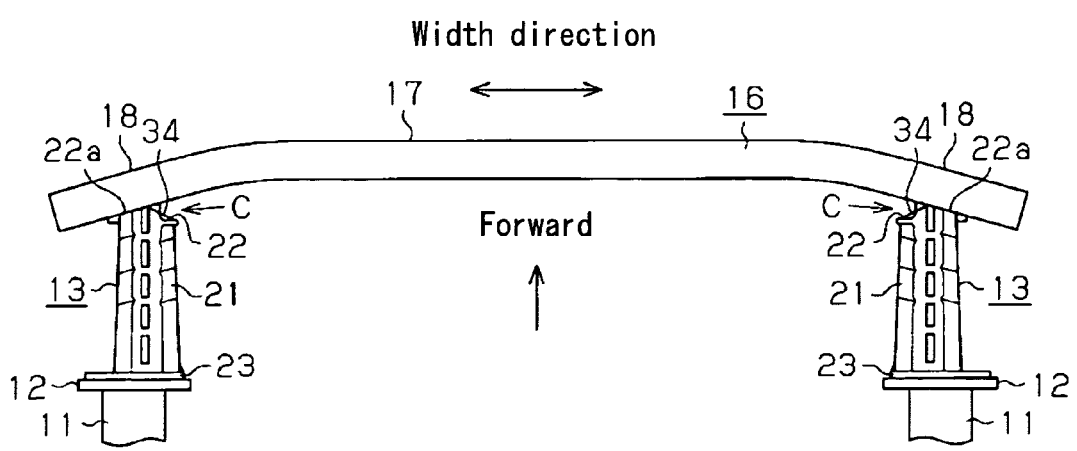
FIG. 3 is a plan view of a bumper device for a vehicle according to the first embodiment disclosed here.

FIG. 3 shows the bumper device for the vehicle applied to a front portion of the vehicle, for example, automobiles according to the embodiment of the disclosure. As shown in FIG. 3, side members 11, 11 extending in a front-rear direction of the vehicle are arranged on the both sides of the bumper device, respectively, in a vehicle width direction. Each of the side members 11 is made from, for example, a metal plate and includes a hollow structure having an approximately rectangular shaped cross-section. The side members 11 serve as a portion of a vehicle body. A bracket 12 formed in approximately rectangular shape and made from metal plate is secured to a front end of each of the side members 11 for closing an opening of each of the side members 11 by welding.

A crash box 13 serving as an impact-absorbing device for a vehicle is attached to a front surface of the brackets 12, 12. The crash box 13 is made from casting member made of aluminum alloy and is arranged to extend in the front-rear direction of the vehicle. According to the embodiment, the aluminum alloy which includes Al—Si alloy added with Sr is adopted.

The crash box 13 integrally includes a cylindrical impact-absorbing portion 21, a bumper side attaching portion 22 serving as a first attaching portion, and a vehicle body side attaching portion 23 serving as a second attaching portion. The cylindrical impact-absorbing portion 21 is configured to absorb an impact energy by compressively deforming (i.e., convoluted deformation) in an axial direction. The bumper side attaching portion 22 is configured to close an opening end of a front end side of the impact-absorbing portion 21. The vehicle body side attaching portion 23 extends in a flange configuration from an opening end of a base end side (i.e., rear end side) of the impact-absorbing portion 21 to be attached to the bracket 12 (side member 11). The bumper side attaching portion 22 has a peaked roof configuration and a center portion of the bumper side attaching portion 22 in a width direction has an acute angle. A front end surface of the bumper side attaching portion 22 includes an attaching surface 22a at an at an outer side in a vehicle width direction relative to the center portion of the bumper side attaching portion 22. The attaching surface 22a inclines towards a rear side of the vehicle as being positioned more outwards in the vehicle width direction.

As shown in FIG. 3, each of end portions of a bumper reinforcement 16 which extends in the vehicle width direction is connected to each of the bumper side attaching portions 22 of the crash box 13. The bumper reinforcement 16 is, for example, made from an excursion member made of aluminum alloy having an approximately constant cross-sectional configuration in a longitudinal direction. The bumper reinforcement 16 includes a linear portion 17 extending linearly in the vehicle width direction and inclined portions 18 continuously formed from ends of the linear portion 17, respectively, to incline towards the vehicle rear side as being positioned more outwards in the vehicle width direction. In those circumstances, border positions between the linear portion 17 and the inclined portions 18, 18 are arranged symmetrically in the vehicle width direction. Each of the inclined portions 18, 18 is positioned facing the front side of the crash box 13 of the vehicle and an inclining angle of the incline portions 18, 18 is determined to correspond to an inclined angle of the attaching surface 22a. Accordingly, the end portion of the bumper reinforcement 16 and the crash box 13 are connected at contact positions of the inclined portions 18, 18 and the attaching surfaces 22a, 22a. That is, the crash box 13 is positioned between the bumper reinforcement 16 (inclined portions 18, 18) and the side member 11 (bracket 12).

A structure of the crash box 13 will be explained as follows. FIGS. 1A to 1D show the crash box 13. As shown in FIGS. 1A to 1D, the impact-absorbing portion 21 includes an upper wall portion 26 and a lower wall portion 27 which are formed approximately in a C-shape in a lateral cross-section and arranged side by side in a top-bottom direction and a connecting wall portion 28 extending in the top-bottom direction to connect opening ends of the upper wall portion 26 and the lower wall portion 27. The opening ends of the upper wall portion 26 and the lower wall portion 27 are narrowed at an opening of a C-shaped portion. As a whole, the impact-absorbing portion 21 includes a substantially hexadecagon or shaped in an approximately thick Roman numeral I shape. The impact-absorbing portion 21 is formed to have an approximately constant plate thickness.

The upper wall portion 26 and the lower wall portion 27 are tapered to be gradually expanded as to be closer to the base end side (i.e., rear end side of the vehicle) along an axial direction of the impact-absorbing portion 21. An inner wall surface 21a of the impact-absorbing portion 21 is formed with a smoothly extended surface in the axial direction (i.e., recesses, concaves and reversal inclinations which incline against a draft direction are not provided in the axial direction). This is for smoothly removing a slide mold (core mold) from the vehicle side attaching portion 23 side in the axial direction (i.e., the draft direction) when casting the crash box 13 by a die casting method. The inner wall surface 21a of the impact-absorbing portion 21 includes a substantially hexadecagon or shaped in an approximately thick Roman numeral I shape in a lateral cross-section.

Plural (e.g., three) groove portions 31 serving as a readily deformable portion are formed on a wall portion 26a provided at each of upper corner portions of the upper wall portion 26. The groove portions 31 are arranged in parallel to one another to be aligned orthogonally to the axial direction of the impact-absorbing portion 21 and are arranged spaced apart from one another.

Likewise, plural (e.g., three) groove portions 31 serving as a readily deformable portion, which are formed spaced apart from one another, are formed on a wall portion 27a provided at each of lower corner portions of the lower wall portion 27. The groove portions 31 are positioned closer to the bumper side-attaching portion 22 of the impact-absorbing portion 21 in an arrangement that the deformed groove portions 31 do not contact one another when the impact-absorbing portion 21 is compressively deformed.

Figure 1A:
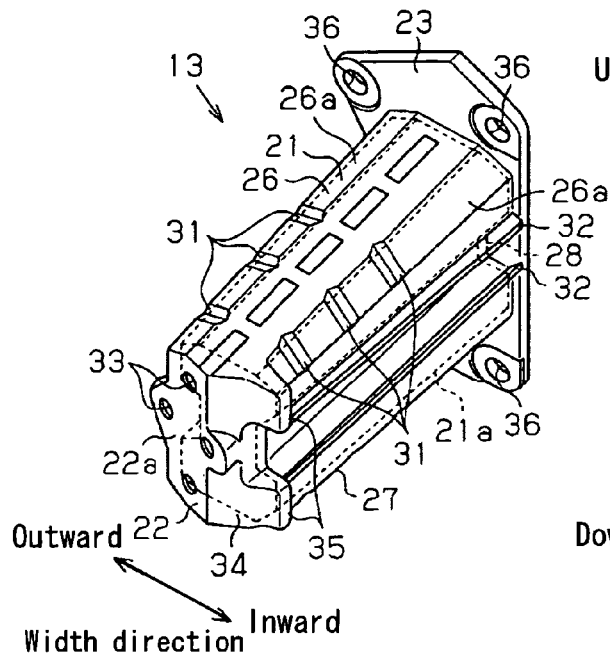
FIG. 1A is a perspective view of an impact absorbing device for a vehicle according to a first embodiment disclosed here.
Figure 1B:
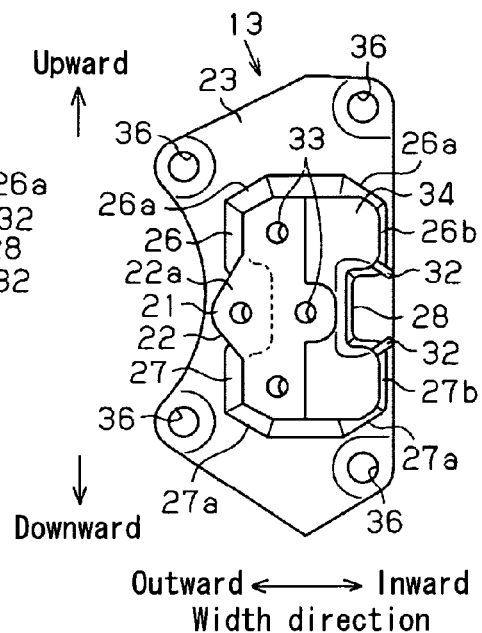
FIG. 1B is a front view of the impact absorbing device for a vehicle according to the first embodiment disclosed here.
Figure 1C:
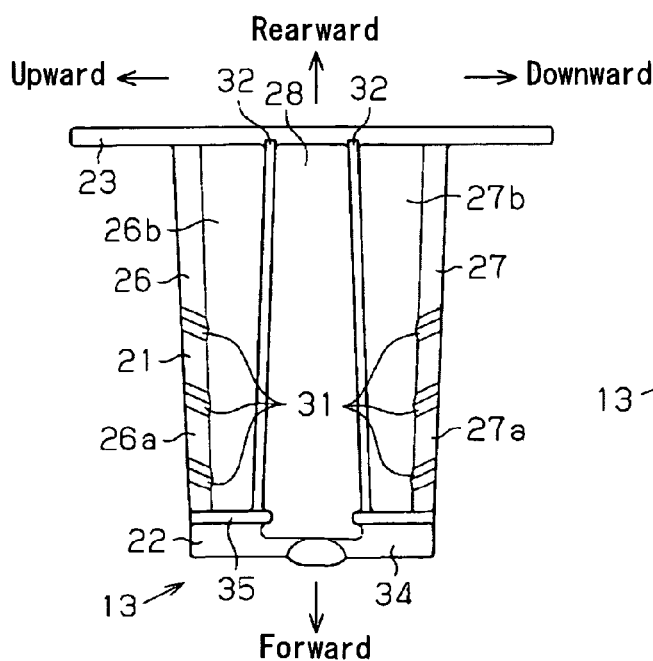
FIG. 1C is a lateral view of the impact absorbing device for a vehicle according to the first embodiment disclosed here.
Figure 1D:
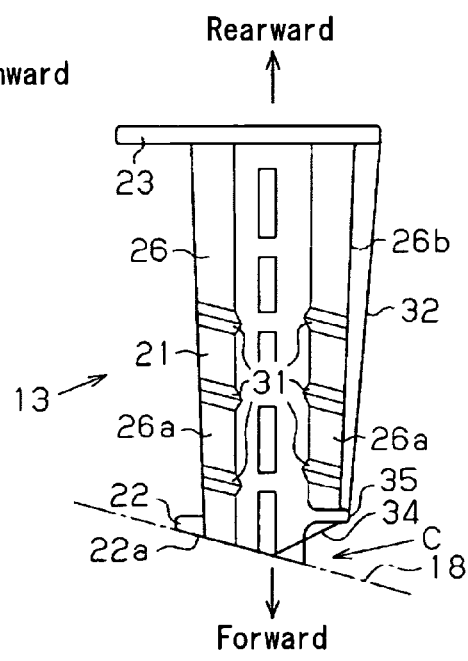
FIG. 1D is a plan view of the impact absorbing device for a vehicle according to the first embodiment disclosed here.
Figure 2:
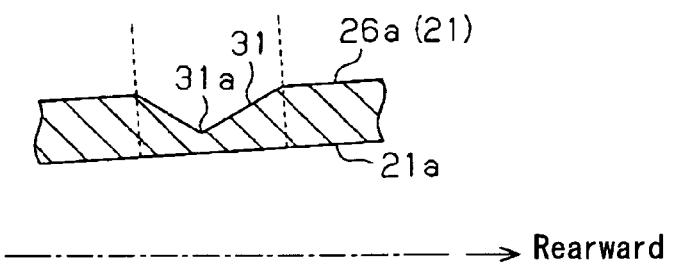
FIG. 2 is a partial cross-sectional view of the impact absorbing device for a vehicle according to the first embodiment disclosed here.

Further, each of the groove portions 31 extends in parallel to the contacting surface (i.e., the attaching surface 22a) contacting the bumper reinforcement 16 of the bumper side-attaching portion 22. Thus, a plate thickness of the impact-absorbing portion 21 is reduced at positions of the groove portions 31 (i.e., a partial range in the axial direction) by a level of recess of the groove portions 31. Particularly, the groove portion 31 gradually changes the plate thickness of the impact-absorbing portion 21 in the axial direction by recessing in approximately triangular shape in cross-section. That is, as schematically shown in a cross-sectional view of FIG. 2, the front-rear plate thickness of the impact-absorbing portion 21 in the axial direction proportionally increases within a range of the groove portion 31 relative to a deepest portion 31a of the groove portion 31. The groove portions 31 are configured to be a starting point of the compressive deformation of the impact-absorbing portion 21 for further stabilizing the compressive deformation.

An approximately triangular plate shaped rib 32 is formed on a lower corner portion of the upper wall portion 26 at an inner portion in the vehicle width direction. The rib 32 is formed to incline downwardly as being positioned closer to the inwards in the vehicle direction. The rib 32 extends over an entire length of the impact-absorbing portion 21 in the axial direction to be connected to the vehicle body side attaching portion 23 and is formed to be tapered as positioned away from the vehicle body side attaching portion 23 in the axial direction. Similarly, an approximately triangular plate shaped rib 32 is formed on an upper corner portion of the lower wall portion 27 at an inner portion in the vehicle width direction. The rib 32 is formed to incline upwardly as positioned closer to the inner side in the vehicle direction. The ribs 32 are arranged to be in parallel to one another one at a higher position and the other at a lower position. The ribs 32 are provided for reinforcing a connecting portion of the impact-absorbing portion 21 to the vehicle body-attaching portion 23.

The bumper side-attaching portion 22 includes plural (e.g., four) bolt insertion holes 33 which penetrate in a direction perpendicular to the attaching surface 22a. A screw shaft of a bolt inserted into each of the bolt insertion holes 33 is geared with a nut so that the bumper side attaching portion 22 (the crash box 12) is tightened to the inclined portion 18.

The bumper side attaching portion 22 includes an initial peak load restraining portion 34 inclined in a direction to be closer to the rearward of the vehicle as being positioned closer to the inner side in the vehicle width direction from the center portion of the bumper side attaching portion 22 in the width direction, whereas the attaching surface 22a inclines in a direction to be closer to the rearward of the vehicle as being positioned closer to the outer side in the vehicle width direction. Thus, the bumper side attaching portion 22 forms a clearance C (see FIG. 1D) between the inclined portion 18 of the bumper reinforcement 16 and the initial peak load restraining portion 34 which is away from the inclined portion 18 to which the attaching surface 22a contacts in the axial direction. The clearance C is formed to concentrate an axial compressive load which is transmitted to the impact-absorbing portion 21 to the attaching surface 22a side (i.e., a partial range of the bumper side attaching portion 22 excluding the initial peak load restraining portion 34) at an initial stage at which the axial compressive load is applied from the bumper reinforcement 16 side at a vehicle collision, or the like. According to the foregoing construction, the impact-absorbing portion 21 is likely to be compressively deformed in the axial direction to restrain a peak load when absorbing an impact at an initial stage of the vehicle collision.

Further, the bumper side-attaching portion 22 includes a padded portion 35 which is formed at a connecting portion to the impact-absorbing portion 21 at the inner side in the vehicle width direction along an external profile of the impact-absorbing portion 21. The padded portion 35 projects inwardly in the vehicle width direction and the projection portion is formed to be thicker in the axial direction. Thus, the axial compressive load transmitted from the bumper reinforcement 16 side to the bumper side attaching portion 22, for example, at the vehicle collision is firmly supported by the padded portion 35 to be transmitted to an opening end of the impact-absorbing portion 21 at the inner side in the vehicle width direction. According to the foregoing construction, the lack of the absorption of the impact energy because of the breaking of the impact-absorbing portion 21 from the opening end of the impact-absorbing portion 21 at the inner side prior to the buckling can be restrained.

The vehicle body side attaching portion 23 extends in four directions of the impact-absorbing portion 21 and includes plural (e.g., four) bolt insertion holes 36 penetrating four corners of the extended portion in a plate thickness direction (i.e., axial direction). The vehicle body side-attaching portion 23 (the crash box 13) is tightened to the bracket 12 (the side member 11) by means of bolts each having screw shafts which are inserted into each of the bolt insertion holes 36 and the bracket 12, and is geared with a nut.

An operation of the impact absorbing device for the vehicle and the bumper device for the vehicle will be explained hereinafter. When an impact is applied from a forward direction by, for example, the vehicle collision, the impact is transmitted to the side members 11 (vehicle body) via the bumper reinforcement 16 and the crash boxes 13, 13. In those circumstances, by the compressive deformation of each of the crash boxes 13, 13, an impact transmitted to the vehicle body and occupants is reduced. That is, the impact-absorbing portion 21 of the crash box 13 compressively deforms in the axial direction by the application of the axial compressive load from the bumper reinforcement 16 side. Particularly, the impact-absorbing portion 21 is likely to be compressively deformed in the axial direction because of the concentration of the axial compressive load transmitted to the impact-absorbing portion 21 via the attaching surface 22a side by having the initial peak load restraining portion 34 (i.e., clearance C) at the initial stage at which the axial compressive load is applied from the bumper reinforcement 16 side, thus restraining the peak load at the initial stage of the vehicle collision.

Further, the axial compressive load transmitted from the bumper reinforcement 16 side to the bumper side attaching portion 22 is firmly supported by the padded portion 35 to be transmitted to the opening end of the impact-absorbing portion 21 at the inner side in the vehicle width direction, the breaking of the impact-absorbing portion 21 from the opening end of the impact-absorbing portion 21 at the inner side prior to the buckling is restrained. Accordingly, a possibility that the absorption of the impact energy by the impact-absorbing portion 21 (the cash box 13) lacks is reduced.

Further, by reinforcing the connecting portion of the impact-absorbing portion 21 to the vehicle body side attaching portion 23 by the rim 32, breaking off of the impact-absorbing portion 21 from the vehicle body side attaching portion 23 having a fulcrum at the vehicle body side attaching portion 23 in the width direction is restrained.

As described above, according to the constructions of the embodiment, the following effects and advantages are attained.

First, according to the construction of the embodiment, because the groove portions 31 are formed on the impact-absorbing portion 21, the compressive deformation of the impact-absorbing portion 21 is facilitated to smoothly absorb the impact energy. Further, the initial peak load-restraining portion 34 of the bumper side-attaching portion 22 is positioned away from the bumper reinforcement 16. Thus, at the initial stage at which the axial compressive load is applied from the bumper reinforcement 16 side at the vehicle collision, the impact-absorbing portion 21 is likely to be compressively deformed in the axial direction and the peak load at the initial stage of the vehicle collision is restrained by the degree of the compressive deformation. Further, because the crash box 13 is made of aluminum alloy and the impact-absorbing portion 21 includes the inner wall surface 21a smoothly extending in the axial direction, by matching a draft direction of the slide mold (core mold) to the axial direction during the casting, for example, by die casting method, the crash box 13 can be manufactured in a single process of the casting.

Second, according to the construction of the embodiment, because the axial compressive load transmitted from the bumper reinforcement 16 side to the bumper side attaching portion 22 by the vehicle collision is firmly supported by the padded portion 35 to be transmitted to the opening end of the impact-absorbing portion 21 at the inner side in the width direction, the lack of the absorption of the impact energy because of the breakings of the impact-absorbing portion 21 from the opening end prior to the buckling can be restrained.

Third, according to the constructions of the embodiment, the connecting portion of the impact-absorbing portion 21 to the vehicle body side attaching portion 23 is reinforced by the rib 32, where a rear side end surface of the rib 32 and a contact surface of the vehicle body side attaching portion 23 supports the force applied at the inner side of the impact-absorbing portion 21, and the breaking off of the impact-absorbing portion 21 from the vehicle body side attaching portion 23 having a fulcrum at the vehicle body side attaching portion 23 in the width direction is restrained. Accordingly, the impact-absorbing portion 21 can be more securely compressively deformed in the axial direction and the impact energy can be more securely absorbed.

Fourth, according to the constructions of the embodiment, the groove portions 31 are arranged in parallel to the attaching surface 22a (i.e., the contact surface with the bumper reinforcement 16) of the bumper side attaching portion 22 and gradually change the strength of the impact-absorbing portion 21 by gradually changing the plate thickness of the impact-absorbing portion 21 in the axial direction. Thus, when the axial compressive load is applied from the bumper reinforcement 16 side, an impact energy absorbing performance of the impact-absorbing portion 21 is more stabilized by facilitating the smooth compressive deformation by the groove portions 31. Particularly, by arranging the groove portions 31 to be in parallel to the attaching surface 22a of the bumper side attaching portion 22, the groove portions 31 allow the impact-absorbing portion 21 to smoothly compressively deform even if the attaching surface 22a inclines relative to a surface which is perpendicular to the axial direction.

Fifth, according to the constructions of the embodiment, by forming the crash box 13 as a single unit, the declination of the strength of the connecting portion, for example, by the welding can be avoided.

Sixth, according to the constructions of the embodiment, by forming the crash box 13 by the die-casting method, the crash box 13 can be manufactured with a simple operation and at lower manufacturing costs.

Seventh, according to the constructions of the embodiment, by adopting Al—Si alloy as the aluminum alloy of which the crash box 13 is made, the castability of the crash box 13 can be enhanced. Further, by adding Sr to the Al—Si alloy, the ductility of the product (the crash box 13) can be enhanced.

Figure 4:
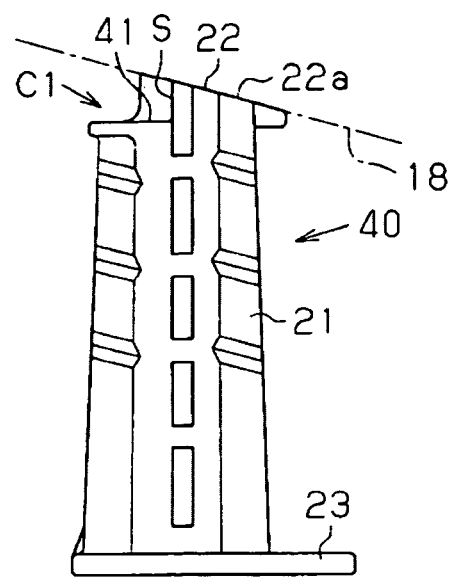
FIG. 4 shows a modified example of the impact absorbing device for a vehicle according the embodiment disclosed here.

Modified examples of the embodiment will be explained hereinafter. For example, as shown in FIG. 4, the crash box 13 may be replaced by a crash box 40 including an initial peak load restraining portion 41 which is formed by recessing an inner side stepwise in the vehicle width direction towards a vehicle rear side via a step S formed in the center portion of the bumper side attaching portion 22 in the width direction. Even if the configuration of the crash box is changed as explained above, a clearance Cl is formed between the inclined portion 18 and the bumper side attaching portion 22 by forming the initial peak load restraining portion 41 to be away from the inclined portion 18 (bumper reinforcement 16) to which the attaching surface 22a contacts in the axial direction. The padded portion 35 which is formed along an external configuration of the impact-absorbing portion 21 may be formed on the crash box 40.

Figure 5:
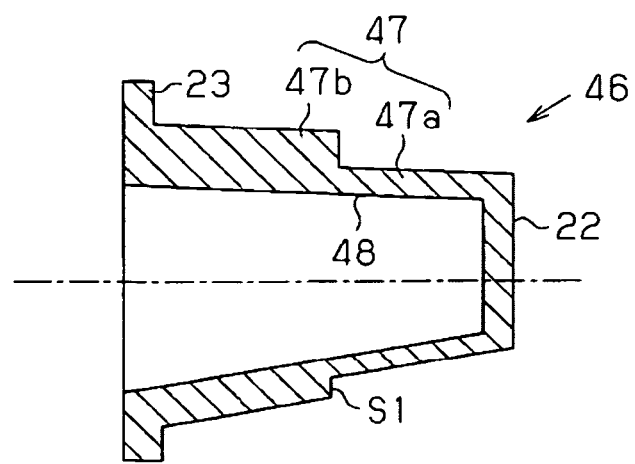
FIG. 5 shows another modified example of the impact absorbing device for a vehicle according the embodiment disclosed here.

As shown in FIG. 5, further, the crash box 13 may be replaced by a crash box 46 which includes a cylindrical impact-absorbing portion 47 including a thinner portion 47a provided at a tip end portion (front end portion) continuously formed to the bumper side attaching portion 22 and a thicker portion 47b provided at a base end portion (rear end portion) continuously formed to the vehicle body side attaching portion 23. An inner wall surface 48 of the impact-absorbing portion 47 includes a surface smoothly extending in the axial direction. Namely, the impact-absorbing portion 47 includes the thinner portion 47a serving as a readily deformable portion and the thicker portion 47b which are arranged in the front-rear direction in the axial direction via a step portion 51 formed at a center portion of an external wall surface of the impact-absorbing portion 47. The impact-absorbing portion 47 is readily formed by die-casting.

Further, configurations of the groove portions 31 may be changed. For example, the groove portions 31 may be recessed in approximately U-shape in cross-section or in approximately a half-circle in cross-section. Further, the plural groove portions 31 may be arranged in parallel to each other at regular intervals in the axial direction of the impact-absorbing portion 21 or may be arranged in parallel to each other at predetermined random intervals. Still further, the number of plural groove portions 31 may be changed. For example, the plural groove portions 31 may be formed over an entire length in the axial direction of the impact-absorbing portion 21.

Although the impact absorbing device for the vehicle and the bumper device for the vehicle are applied to the front portion of the vehicle according to the embodiment, the impact absorbing device for the vehicle and the bumper device for the vehicle may be provided at a rear portion of the vehicle.

According to the construction of the embodiment, an impact absorbing device 13 (41)(46) for a vehicle, the impact absorbing device 31(41)(46) made of aluminum alloy and configured to be provided between a bumper reinforcement 16 extended in a vehicle width direction and the side member 11 extended in a front-rear direction of the vehicle at an end portion of the bumper reinforcement 16, includes the cylindrical impact-absorbing portion 21(47) including the inner wall surface 21a extending smoothly in the axial direction, the impact-absorbing portion 21(47) being configured to compressively deform in the axial direction for absorbing an impact energy, the first attaching portion 22 closing the opening end of the impact-absorbing portion 21(47) closer to the bumper reinforcement 16 and configured to be attached to the bumper reinforcement 16, the second attaching portion 23 extending from the opening end of the impact-absorbing portion 21(47) closer to the side member 11 and configured to be attached to the side member 11, the readily deformable portion 31 provided at the impact-absorbing portion 21(47), the readily deformable portion 31 formed by forming a plate thickness to be thinner in a partial range of the impact-absorbing portion in the axial direction, and the initial peak load restraining portion 34(41) provided at the first attaching portion and set to be away from the bumper reinforcement 16 in the axial direction. The cylindrical impact-absorbing portion 21(47), the first attaching portion 22, the second attaching portion 23, readily deformable portion 31, and the initial peak load restraining portion 34, 41 are integrally formed.

According to the construction of the embodiment, when the axial compressive load is applied from the bumper reinforcement 16 side, for example, at a vehicle collision, the impact-absorbing portion 21(47) is compressively deformed in the axial direction to absorb an impact energy. In those circumstances, because of the groove portions (readily deformable portion) 31 provided at the impact-absorbing portion 21(47), the compressive deformation of the impact-absorbing portion 21(47) is facilitated to smoothly absorb the impact energy. Further, the bumper side-attaching portion (the first attaching portion) 22 is positioned away from the bumper reinforcement 16 in the axial direction at the initial peak load restraining portion 34, 41. Thus, at the initial stage of the application of the axial compressive load from the bumper reinforcement 16, for example, when the vehicle collides, the axial compressive load transmitted to the impact-absorbing portion 21(47) is concentrated onto a partial range of the bumper side attaching portion (first attaching portion) 22 excluding the initial peak load restraining portion 34, 41. According to this construction, the impact-absorbing portion 21(47) is likely to be compressively deformed in the axial direction and the peak load at the initial stage of the vehicle collision can be restrained by the degree of the compressive deformation. Further, because the crash box (impact absorbing device) 13 (41)(46) is made of aluminum alloy and includes an inner surface smoothly extending in the axial direction, by matching a draft direction of the slide mold (core mold) to the axial direction during the casting, for example, by die casting method, the crash box (impact absorbing device) 13 (41)(46) can be manufactured in a single process of the casting.

According to the construction of the embodiment, the padded portion 35 is formed at a connecting portion of the first attaching portion 22 to the impact-absorbing portion 21(47) along an outer profile of the impact-absorbing portion 21(47).

According to the construction of the embodiment, the axial compressive load transmitted from the bumper reinforcement 16 side to the bumper side-attaching portion (first attaching portion) 22 by the vehicle collision is firmly supported by the padded portion 35 to be transmitted to an opening end at the inner side in the vehicle width direction of the impact-absorbing portion 21(47). Thus, the lack of the absorption of the impact energy because of the breaking of the impact-absorbing portion 21(47) from the opening end prior to the buckling can be restrained.

According to the construction of the embodiment, the rib 32 is provided at the impact-absorbing portion 21(47) to project in a vehicle width direction and connected to the second attaching portion 23. The rib 32 is configured to reinforce a connecting portion of the impact-absorbing portion 21(47) relative to the second attaching portion 23.

According to the construction of the embodiment, by reinforcing the connecting portion of the impact-absorbing portion 21(47) relative to the vehicle body side attaching portion (second attaching portion) 23 by the rib 32, breaking off of the impact-absorbing portion 21(47) from the vehicle body side attaching portion 23 having a fulcrum at the vehicle body side attaching portion (second attaching portion) 23 in the width direction is restrained. Accordingly, the impact-absorbing portion 21(47) can be more securely compressively deformed in the axial direction and the impact energy can be more securely absorbed.

According to the construction of the embodiment, the readily deformable portion 31 corresponds to at least one groove portion which extends in parallel to a contact surface of the first attaching portion 22 configured to contact the bumper reinforcement 16 and gradually changes a plate thickness of the impact-absorbing portion 21(47) in the axial direction.

According to the construction of the embodiment, the groove portions (readily deformable portion) 31 is arranged to extend in parallel to the attaching surface (the contact surface to) 22a contacting the bumper reinforcement 16 of the bumper side attaching portion (first attaching portion) 22 and the plate thickness of the impact-absorbing portion 21(47) is gradually changed in the axial direction for gradually changing the strength (rigidity) of the impact-absorbing portion 21(47). Thus, when the axial compressive load is applied from the bumper reinforcement 16 side, an impact energy absorbing performance of the impact-absorbing portion 21(47) is more stabilized by facilitating the smooth compressive deformation by the groove portions (readily deformable portion) 31. Particularly, by arranging the groove portions (readily deformable portion) 31 to be in parallel to the attaching surface 22a of the bumper side attaching portion (first attaching portion) 22 configured to be attached to the bumper reinforcement 16, the groove portions (readily deformable portion) 31 allow to smoothly compressively deform the impact-absorbing portion 21(47) even if the attaching surface 22a inclines relative to a surface which is perpendicular to the axial direction.

According to the construction of the embodiment, the impact-absorbing device 31(41)(46) is made of an Al—Si alloy added with Sr.

According to the construction of the embodiment, because the Al—Si alloy is adopted as the aluminum alloy of which the crash box (impact absorbing device) 13 (41)(46) is made, the castability of the crash box (impact absorbing device) 13 (41)(46) is enhanced. Further, because Sr is added to the Al—Si alloy, the ductility of the product (crash box (impact absorbing device) 13 (41)(46)) is enhanced.

According to the construction of the embodiment, a bumper device for a vehicle includes a bumper reinforcement extended in a vehicle width direction, and an impact absorbing device 13, (41)(46) for a vehicle. The impact absorbing device 13, (41)(46) is made of aluminum alloy and configured to be provided between a bumper reinforcement 16 extended in a vehicle width direction and a side member 11 extended in a front-rear direction of the vehicle at an end portion of the bumper reinforcement 16. The impact absorbing device 13, (41)(46) includes a cylindrical impact-absorbing portion 21(47) including an inner wall surface 21a extending smoothly in an axial direction, the impact-absorbing portion 21(47) being configured to compressively deform in the axial direction for absorbing an impact energy, a first attaching portion 22 closing an opening end of the impact-absorbing portion 21(47) closer to the bumper reinforcement 16 and configured to be attached to the bumper reinforcement 16, a second attaching portion 23 extending from an opening end of the impact-absorbing portion 21(47) closer to the side member 11 and configured to be attached to the side member 11, a readily deformable portion 31 provided at the impact-absorbing portion 21(47), the readily deformable portion 31 formed by forming a plate thickness to be thinner in a partial range of the impact-absorbing portion in the axial direction, and an initial peak load restraining portion 34(41) provided at the first attaching portion and set to be away from the bumper reinforcement 16 in the axial direction. The cylindrical impact-absorbing portion 21(47), the first attaching portion 22, the second attaching portion 23, readily deformable portion 31, and the initial peak load restraining portion 34(41) are integrally formed.

According to the construction of the embodiment, an impact energy of the bumper device can be favorably absorbed while restraining an increase of manufacturing hours.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An impact absorbing device for a vehicle, the impact absorbing device made of aluminum alloy and configured to be provided between a bumper reinforcement extended in a vehicle width direction and a side member extended in a front-rear direction of the vehicle at an end portion of the bumper reinforcement, comprising:
   a cylindrical impact-absorbing portion including an inner wall surface extending smoothly in an axial direction, the impact-absorbing portion being configured to compressively deform in the axial direction for absorbing an impact energy;
   a first attaching portion closing an opening end of the impact-absorbing portion closer to the bumper reinforcement and configured to be attached to the bumper reinforcement;
   a second attaching portion extending from an opening end of the impact-absorbing portion closer to the side member and configured to be attached to the side member;
   a readily deformable portion provided at the impact-absorbing portion, the readily deformable portion formed by forming a plate thickness to be thinner in a partial range of the impact-absorbing portion in the axial direction;
   an initial peak load restraining portion provided at the first attaching portion and set to be away from the bumper reinforcement in the axial direction; and
   a rib provided on an outer surface of the impact-absorbing portion to project in the vehicle width direction and connected between the second attaching portion and a connecting portion of the impact-absorbing portion, the rib being formed to incline upwardly as positioned closer to an inner side in the vehicle width direction,
   wherein the cylindrical impact-absorbing portion, the first attaching portion, the second attaching portion, the readily deformable portion, the initial peak load restraining portion, and the rib are integrally formed.

2. The impact absorbing device according to claim 1, further comprising:
   a padded portion formed at a connecting portion of the first attaching portion to the impact-absorbing portion along an outer profile of the impact-absorbing portion.

3. The impact absorbing device according to claim 1, wherein the readily deformable portion corresponds to at least one groove portion which extends in parallel to a contact surface of the first attaching portion configured to contact the bumper reinforcement and gradually changes a plate thickness of the impact-absorbing portion in the axial direction.

4. The impact-absorbing device according to claim 1, wherein the impact-absorbing device is made of an Al—Si alloy added with Sr.

5. A bumper device for a vehicle, comprising:
   a bumper reinforcement extended in a vehicle width direction; and
   an impact absorbing device for a vehicle, the impact absorbing device made of aluminum alloy and configured to be provided between a bumper reinforcement extended in the vehicle width direction and a side member extended in a front-rear direction of the vehicle at an end portion of the bumper reinforcement, comprising:
   a cylindrical impact-absorbing portion including an inner wall surface extending smoothly in an axial direction, the impact-absorbing portion being configured to compressively deform in the axial direction for absorbing an impact energy;
   a first attaching portion closing an opening end of the impact-absorbing portion closer to the bumper reinforcement and configured to be attached to the bumper reinforcement;
   a second attaching portion extending from an opening end of the impact-absorbing portion closer to the side member and configured to be attached to the side member;
   a readily deformable portion provided at the impact-absorbing portion, the readily deformable portion formed by forming a plate thickness to be thinner in a partial range of the impact-absorbing portion in the axial direction; and
   an initial peak load restraining portion provided at the first attaching portion and set to be away from the bumper reinforcement in the axial direction; wherein the cylindrical impact-absorbing portion, the first attaching portion, the second attaching portion, the readily deformable portion, and the initial peak load restraining portion are integrally formed, and a rib provided on an outer surface of the impact-absorbing portion to project in the vehicle width direction and connected between the second attaching portion and a connecting portion of the impact-absorbing portion, the rib being formed to incline upwardly as positioned closer to an inner side in the vehicle width direction.

6. The impact absorbing device according to claim 1, wherein the rib is approximately triangular plate shaped.

7. The bumper device according to claim 5, wherein the rib is approximately triangular plate shaped.

* * * * *